Dec. 9, 1958 A. CANEPA 2,863,682
EXPANSION JOINT APT TO CONNECT FOUR OR MORE TUBULAR ELEMENTS
LYING IN PLANES ORTHOGONAL TO EACH OTHER, ONE
OF THEM BEING A CONTINUOUS TUBULAR
ELEMENT PASSING THROUGH THE JOINT
Filed April 13, 1955
3 Sheets-Sheet 1
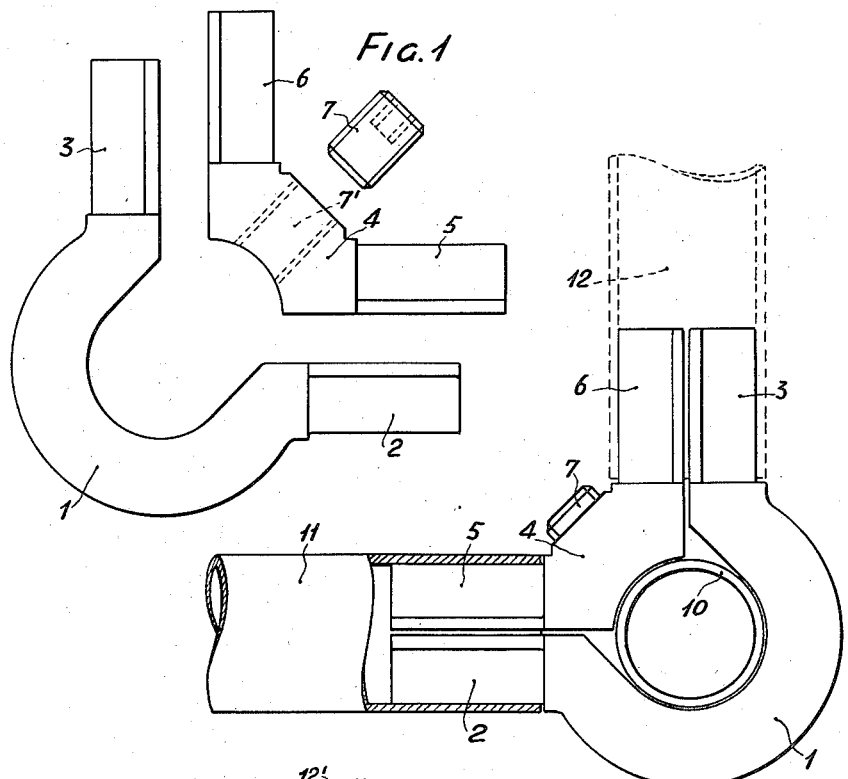
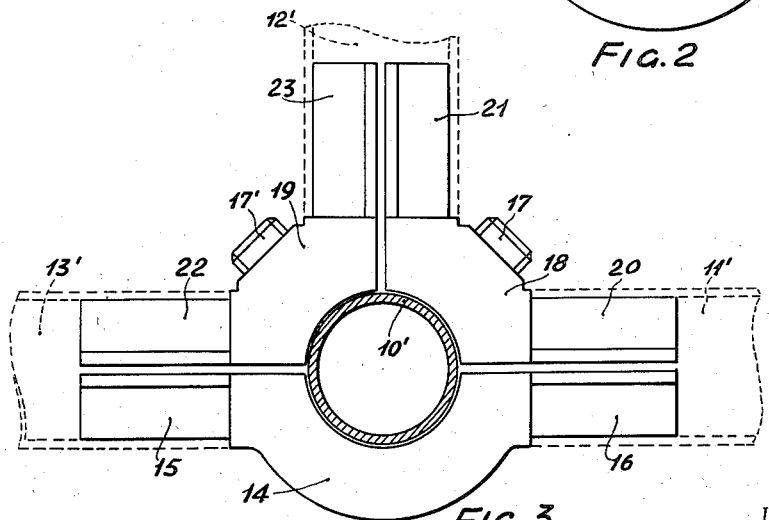
INVENTOR
Agostino Canepa
BY
ATTORNEY Dec. 9, 1958 A. CANEPA 2,863,682
EXPANSION JOINT APT TO CONNECT FOUR OR MORE TUBULAR ELEMENTS
LYING IN PLANES ORTHOGONAL TO EACH OTHER, ONE
OF THEM BEING A CONTINUOUS TUBULAR
ELEMENT PASSING THROUGH THE JOINT
Filed April 13, 1955 3 Sheets-Sheet 2
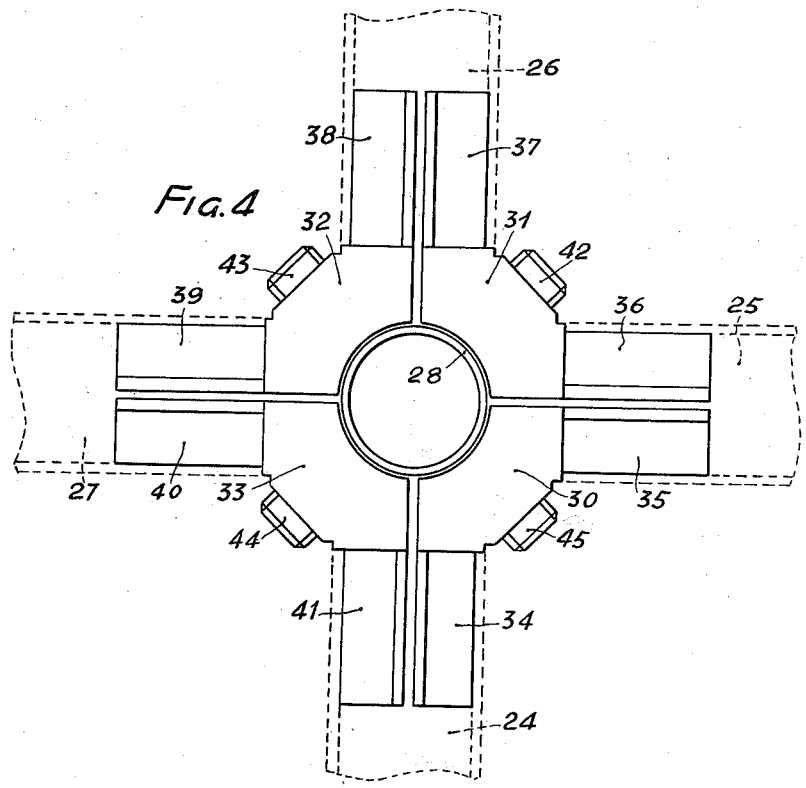
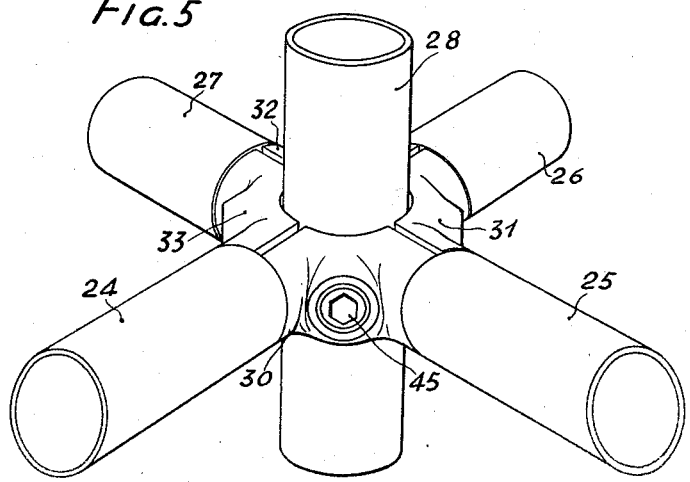
INVENTOR
Agostino Canepa
BY
ATTORNEY Dec. 9, 1958 A. CANEPA 2,863,682
EXPANSION JOINT APT TO CONNECT FOUR OR MORE TUBULAR ELEMENTS
LYING IN PLANES ORTHOGONAL TO EACH OTHER, ONE
OF THEM BEING A CONTINUOUS TUBULAR
ELEMENT PASSING THROUGH THE JOINT
Filed April 13, 1955 3 Sheets-Sheet 3

INVENTOR
Agostino Canepa
BY
ATTORNEY

United States Patent Office 2,863,682
Patented Dec. 9, 1958

2,863,682

EXPANSION JOINT APT TO CONNECT FOUR OR MORE TUBULAR ELEMENTS LYING IN PLANES ORTHOGONAL TO EACH OTHER, ONE OF THEM BEING A CONTINUOUS TUBULAR ELEMENT PASSING THROUGH THE JOINT

Agostino Canepa, Milan, Italy

Application April 13, 1955, Serial No. 501,066

Claims priority, application Italy May 11, 1954

8 Claims. (Cl. 287—54)

Various and numerous applications of tubular joints are known, designed to provide a quick and demountable construction of scaffoldings, shelvings and the like. Various and different types of joints are also known for connecting the said tubular elements and amongst them are some, called expansion joints, i. e. those in which the connection between the joint and each tubular element is obtained by slipping the ends of the tubular element over projections belonging to the separate parts of the joint, and which, after the introduction of the tube, are forced to move apart from each other in such a way as to exert a great pressure upon the walls of the tube, thus ensuring a rigid connection between joint and tube.

Other types of joints are, instead, provided with organs designed to encircle the tubular elements to which they are connected, by pressure upon the outer wall of the tube. The latter type of joint is commonly applied at intermediate points of the tubular elements and therefore the axes of the tubular elements connected by the said joints lie in different planes and therefore do not intersect each other. Expansion joints instead connect to each other tubular elements in such a manner that the axes of the latter intersect at a single point, but they are commonly applied to the extremities of the tubes.

The joint that is the object of the present invention is a combination of the two above said types of joints, and can therefore be defined as an expansion joint, provided, however, with organs capable of encircling a tubular element at an intermediate point of the same, that is, without interrupting the continuity of the said tubular element inside of the joint, as was the case with the common expansion joints.

Particularly, the joint according to the invention is characterized by this, that it comprises elements provided with curved seats for a continuous tubular element, besides expansion wings for connection of the joint to other tubular elements to be connected with the first tube, so that the axes of these various elements intersect each other in a point, the expansion of the different elements of the joint being realized by means of screw elements designed to press against the outer wall of the continuous tubular element disposed in the hollow seats of the various elements constituting the joint.

The joint according to the invention is also suitable for realizing lattice work or framework and particularly for the mounting of diagonal tubes. In the latter case it comprises two half-collar or half-circle like shaped parts engaging each other at their rear portion according to a plane parallel to the axis of the main tube, encircled by the tube, whereas the other two extremities of the collar are brought together and present, each of them at one side, an extension which on being arranged parallel to the extension of the contiguous part forms a forcing plug penetrating in the end of the diagonal tube to be connected, while at the other end a set screw penetrates radially through the collar down to the main tube to push the two halves of the plug apart reciprocally thus causing it to operate as an expander, so as to lock the collar to the diagonal tube as well as to the main tube and consequently stabilize the junction between the two tubes.

The attached drawing illustrates schematically and by way of example some forms of embodiment of the object of the invention and designed:

Fig. 1 is a side view of the elements, separated from each other, of a joint according to the invention, and suitable for connecting a continuous tubular element, and of two or more elements perpendicular to each other as well as to the continuous element.

Fig. 2 shows the same joint as mounted upon three elements, as above said.

Fig. 3 shows an assembled joint according to the invention, designed to connect to each other a continuous tubular element and three elements engageable by their ends.

Fig. 4 is an analogous view to the preceding ones, of a joint adapted to interconnect five elements of which one is continuous and double, and the other four are disposed two by two aligned and perpendicular both to each other and to the first cited continuous element.

Fig. 5 is a perspective view of the Fig. 4 joint with portions of the elements connected by it.

Figure 7:
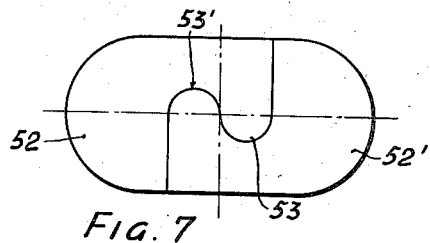
Fig. 7 is a view of the rear end according to the arrow 50 of Fig. 6.

According to Figs. 1 and 2, the joint according to the invention comprises in its simplest form an element 1 having a semi-circular seat apt to encircle a portion of the continuous tubular element over which the joint is to be applied; the said element 1, developing itself along three quarters of a circle, ends at its extremities with two wings 2 and 3 respectively, having a T cross section and adapted to be slipped, together with corresponding wings presented by the element 4 of the same joint, into the extremities of the other two tubular elements that the joints is to connect. These wings are indicated by 5 and 6 in Figs. 1 and 2, the element 4 being such as to partially encircle the portion of the continuous tubular element, that is indicated in Fig. 2 by 10, of which one half only is encircled by the element 1. The joint is completed by a screw element 7 which cooperates with a corresponding tapped hole provided in the element 4, whose axis is oblique with respect to the axes of the tubular elements 11 and 12 and therefore of the pairs of wings 2—5 and 3—6.

The assembled joint is clearly illustrated in Fig. 2, which illustrates how the continuous element 10 is connected with the other tubular elements 11 and 12 engaged with the joint by their extremities. The mounting of the above described joint is very simple, as follows: the element 1 of the joint having been placed around the tube 10, the element 4 will be put in place and then over the pairs of wings 2—5 and 3—6 will be slid the ends of respectively the tubes 11 and 12. This done, the threaded element 7 is screwed into the corresponding hole 7' and tightened by means of a special key thus pressing against the outer wall of the tube 10, and forcing the element 4 and consequently the wings 5 and 6 carried by the latter, to move away from the element 1 and its respective wings 2 and 3, so as to cause a strong pressure to be exerted upon the inner walls of the tubes 11 and 12, respectively, said pressure being sufficient for rigidly connecting the said joint and the tubular elements 11 and 12, as well as the element 10 which will also result tightened and pressed between the base of the screw 7 and the seat provided for it upon the part 1.

To take these elements apart it will be sufficient to loosen the screw 7 and all of the elements of the joint will move apart permitting an easy separation of the tubular elements 10, 11, 12.

The joint illustrated by Fig. 3 is analogous to the preceding one, only it is suitable for connecting an additional member besides those already considered, i. e., the continuous element 10' with the three elements 11', 12' and 13', connected to the joint by their ends.

The joint of Fig. 3 comprises an element 14 able to encircle one half of the tube 10' and ending at its extremities, respectively by the wings 15 and 16 aligned with each other. The joint is completed by the elements 18 and 19, each provided with a pair of wings 20 and 21, 22 and 23 respectively, perpendicular to each other and capable of coupling to each other in the manner clearly shown in the drawing after their engagement with the extremities of the tubular elements 11', 12', 13' as said before.

The expansion of this joint, intended to guarantee the rigid connection of the various tubular elements by means of the joint, is realized by tightening down hard the two screws 17 and 17', equal to the screw 7 described when speaking of Figs. 1 and 2.

The joint shown in Figs. 4 and 5 can interconnect one more tubular element than those provided in Fig. 3. It is constituted of four elements 30, 31, 32 and 33 equal to each other and equal to the elements 18 and 19 of Fig. 3. Each of them is provided with two wings 34 and 35, 36 and 37, 38 and 39, 40 and 41 respectively, which, when the joint is in the assembling position, will result adjacent in pairs as clearly illustrated in Fig. 4 and upon each of these pairs of wings there will be slipped an extremity of the elements 24, 25, 26 and 27. These tubular elements will thus be rigidly connected to each other as well as to the continuous tubular element 28 passing through the just described joint. The joint will be put under tension by tightening the screws 42, 43, 44 and 45 and by so doing there will be obtained a rigid connection between the 5 elements 28, 26, 27, 25 and 24, the first one being a continuous element projecting from both sides of the joint.

The joint could also comprise but two diagonally placed set screws as for instance 42 and 44, in place of four, as in the drawing.

The structures obtainable with this type of joint possess the advantage of having the different elements connected with axes concurrent to a point, and besides, as they permit of one amongst the connected elements being continuous, possess the advantage, especially for shelving, of possessing a greater strength for the laying of floors or the like.

Lastly, the other characteristic of the joint which is the object of the invention and which provides T shaped wings in place of tubular ones, allows of obtaining, for the same weight, the advantage of a greater strength of the joint.

Figure 6:
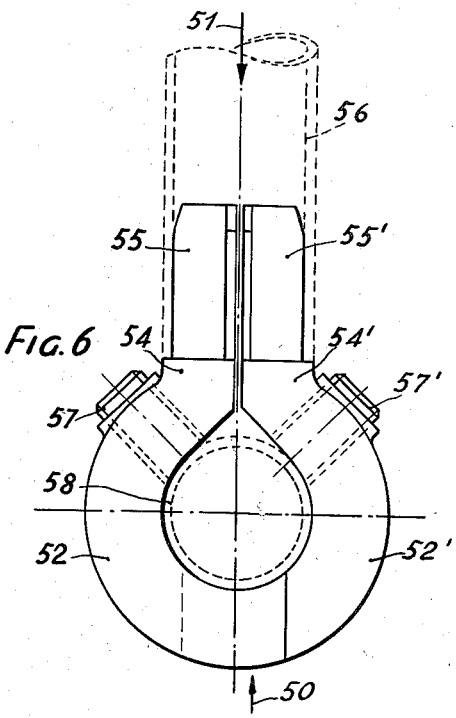
Fig. 6 is a side view of a joint for assembling diagonal tubes.
Figure 8:
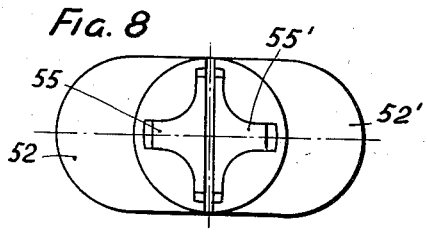
Fig. 8 is a view of the front end according to the arrow 51 of Fig. 6.

As seen from the drawing, the joint represented in Figs. 6, 7 and 8 is particularly suitable for the mounting of cross and diagonal members intended to render the structure more rigid by means of stays.

This joint is divided into two semicircular parts 52 and 52' whose rear portion presents at least one projecting tooth 53 and at least one depression 53' reciprocally engaging with one another by the tooth and the depression of the other half-ring in a direction parallel to the oscillation plane of the other two ends 54, 54'. Each of these extremities 54, 54' terminates with a T shaped piece 55 forming with the other specular piece 55' a plug or cross-shaped piston which enters the tube 56 and can be fixed through two set screws 57, 57' which by pressing onto the tube 58 perpendicular to the tube 56 lock the latter upon the plug 55—55', whose halves move apart from one another, opening out like an expander; in this way the two tubes 56 and 58 result solid with one another.

The shape of the elements constituting the halves of the expanded 55—55' may be that represented in Fig. 8, or any other, just as their length may vary, according to the strength desired.

It is understood that the materials constituting the different elements of the joint, the dimensions and the constructional details may be varied according to necessity, without for this reason going out of the field of the present invention.

What I claim is:

1. An expansion joint for connecting an intermediate portion of one continuous tubular member to an end of at least one other tubular member with the axes of the tubular members intersecting each other at a common point; said expansion joint comprising, in combination, at least two joint elements constructed to be disposed in end to end relation around an intermediate portion of a continuous tubular member and having circumferentially extending arcuate inner surfaces arranged to embrace substantially the entire circumferential periphery of such intermediate portion, and conjointly providing an unobstructed passageway for the continuous tubular element to extend completely through and to each side of the expansion joint; said members having relatively elongated wings extending from their adjacent ends in parallel relation to each other for insertion into an end of another tubular member to be joined to such continuous tubular member; and a pressure element threaded through at least one of said elements substantially radially of the arcuate surface thereof to engage the surface of such continuous tubular member to force said one element away from such surface to force said wings apart and into pressure engagement with the inner surface of such other tubular member to pressure lock said tubular members together.

2. An expansion joint as claimed in claim 1 in which said wings are T-shaped in cross-section.

3. An expansion joint as claimed in claim 1 in which there are two joint elements having circumferential extents of substantially 270 degrees and substantially 90 degrees respectively, each element having a wing at each end of its arcuate surface respectively perpendicular to each other; each pair of adjacent wings extending parallel to each other and being engageable in the end of a different one of two tubular members to connect the latter to the continuous tubular member.

4. An expansion joint as claimed in claim 1, for connecting the ends of three tubular members to the continuous tubular member and comprising three joint elements, one having a circumferential extent of substantially 180 degrees and the other two having circumferential extent of substantially 90 degrees; each element having a wing at each end, the two wings of the longer element being aligned and the two wings of each shorter element being perpendicular to each other; each shorter element having a pressure element threaded therethrough between its wings.

5. An expansion joint as claimed in claim 1, for connecting the ends of four tubular members to the continuous tubular member and comprising four joint elements each having a circumferential extent of substantially 90 degrees and a wing at each end, the two wings of each joint element being perpendicular to each other, and each joint element having a pressure element threaded therethrough between its wings.

6. An expansion joint as claimed in claim 1 in which there are two joint elements, each having a circumferential extent of substantially 180 degrees and a wing at one end, the two wings being substantially parallel to each other, the two joint elements being releasably interengaged at their opposite ends; and a pressure element threaded through each joint element adjacent its winged end.

7. An expansion joint as claimed in claim 6 in which said joint elements are substantially identical and their said opposite ends are each formed with a semi-cylindrical recess merging with a semi-cylindrical abutment both having axes substantially parallel to the length of said wings, the recess of one joint element being interlockingly interengageable with the projection of the other joint element and vice versa.

8. An expansion joint as claimed in claim 7 in which the axis of each pressure element is at substantially 45 degrees to the adjacent wing.

References Cited in the file of this patent

UNITED STATES PATENTS

| | | |
|---|---|---|
| 1,347,808 | Franklin | July 27, 1920 |
| 1,460,928 | Tilden | July 3, 1923 |
| 2,065,902 | Levin | Dec. 29, 1936 |
| 2,198,964 | Goodyear | Apr. 30, 1940 |
| 2,281,220 | Anderson | Apr. 28, 1942 |

FOREIGN PATENTS

| | | |
|---|---|---|
| 524,331 | Belgium | Dec. 15, 1953 |